United States Patent
Purushothaman et al.

(10) Patent No.: US 11,102,103 B2
(45) Date of Patent: Aug. 24, 2021

(54) NETWORK STABILIZING TOOL

(71) Applicant: Bank of America Corporation, Charlotte, NC (US)

(72) Inventors: Sasidhar Purushothaman, Hyderabad (IN); Atul Agarwal, Faridabad (IN); Nikit Malhotra, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 864 days.

(21) Appl. No.: 14/948,439

(22) Filed: Nov. 23, 2015

(65) Prior Publication Data

US 2017/0149643 A1    May 25, 2017

(51) Int. Cl.
*H04L 12/26*    (2006.01)
*H04L 12/24*    (2006.01)

(52) U.S. Cl.
CPC .......... *H04L 43/10* (2013.01); *H04L 41/0672* (2013.01); *H04L 43/065* (2013.01)

(58) Field of Classification Search
CPC .... H04L 43/10; H04L 43/065; H04L 41/0672
See application file for complete search history.

(56) References Cited

U.S. PATENT DOCUMENTS

| | | | | |
|---|---|---|---|---|
| 5,621,663 A | * | 4/1997 | Skagerling | G06F 11/0709 702/186 |
| 5,678,042 A | * | 10/1997 | Pisello | G06F 16/168 714/47.3 |
| 5,781,703 A | * | 7/1998 | Desai | G06F 16/168 714/47.3 |
| 6,122,664 A | * | 9/2000 | Boukobza | G06F 11/0709 345/418 |

(Continued)

FOREIGN PATENT DOCUMENTS

| | | | | |
|---|---|---|---|---|
| CA | 2325067 A1 | * | 4/2001 | ......... G06F 9/30109 |
| WO | WO 0235315 A2 | * | 5/2002 | ......... H04L 41/0213 |

(Continued)

OTHER PUBLICATIONS

IBM Tivoli Monitoring Version 6.3 Unix OS Agent User Interface Reference Apr. 2013,© IBM Corporation, 1994, 2013.*

(Continued)

*Primary Examiner* — Emmanuel L Moise
*Assistant Examiner* — Robert A Shaw
(74) *Attorney, Agent, or Firm* — Weiss & Arons LLP; Michael A. Springs, Esq.

(57) ABSTRACT

Apparatus and methods for protecting a server network from a failure. The network may include a central console. The network may include one or more client servers. The central console may include a transmitter that is configured to periodically transmit to the client server a diagnostic probe. The probe may be selected to ascertain a state of an agent of the client server. The diagnostic probe may include a sequence of queries. Each query may be configured to cause, when the state is "ONLINE," a normal result in the agent. A processor may be configured to record a reaction of an agent to the query. The reaction may be anomalous. A processor may be configured to map the reaction to a system administrator instruction. The transmitter may be configured to transmit the system administrator instruction to the client server.

18 Claims, 4 Drawing Sheets

(56) References Cited

U.S. PATENT DOCUMENTS

| | | | |
|---|---|---|---|
| 6,185,600 B1* | 2/2001 | Spence | G06F 11/328 709/203 |
| 6,289,378 B1* | 9/2001 | Meyer | G06F 21/31 709/202 |
| 6,349,335 B1* | 2/2002 | Jenney | G06F 11/3006 706/50 |
| 6,618,817 B1* | 9/2003 | Armstrong | G06F 9/30109 712/E9.025 |
| 7,069,480 B1* | 6/2006 | Lovy | G06F 21/88 726/35 |
| 7,237,138 B2 | 6/2007 | Greenwald et al. | |
| 7,296,194 B1* | 11/2007 | Lovy | G06F 11/0709 709/224 |
| 7,444,633 B2* | 10/2008 | Bohn | H04L 67/34 718/1 |
| 7,451,488 B2 | 11/2008 | Cooper et al. | |
| 7,610,588 B1* | 10/2009 | Hager | H04L 41/0213 709/202 |
| 7,620,848 B1* | 11/2009 | Tanner | G06F 11/0709 709/224 |
| 7,996,718 B1* | 8/2011 | Ou | G06F 11/1464 714/23 |
| 8,260,893 B1* | 9/2012 | Bandhole | G06F 9/5083 709/221 |
| 8,286,248 B1 | 10/2012 | Oliphant et al. | |
| 8,601,586 B1 | 12/2013 | Boutros et al. | |
| 9,830,243 B1* | 11/2017 | Williams | G06F 11/1438 |
| 9,910,707 B2* | 3/2018 | Razin | G06F 11/30 |
| 2001/0010053 A1* | 7/2001 | Ben-Shachar | G06F 9/465 718/105 |
| 2001/0044841 A1* | 11/2001 | Kosugi | H04L 41/069 709/223 |
| 2001/0052006 A1* | 12/2001 | Barker | H04L 41/22 709/223 |
| 2002/0091944 A1* | 7/2002 | Anderson | G06Q 10/06 709/223 |
| 2002/0169867 A1* | 11/2002 | Mann | H04L 43/10 709/224 |
| 2003/0009540 A1* | 1/2003 | Benfield | H04L 41/0213 709/220 |
| 2003/0009552 A1* | 1/2003 | Benfield | H04L 41/0213 709/224 |
| 2003/0033402 A1* | 2/2003 | Battat | H04L 41/0213 709/220 |
| 2003/0065986 A1* | 4/2003 | Fraenkel | G06F 11/3089 714/47.2 |
| 2003/0144894 A1* | 7/2003 | Robertson | G06Q 20/00 709/226 |
| 2003/0196136 A1* | 10/2003 | Haynes | G06F 11/3495 714/13 |
| 2003/0225549 A1* | 12/2003 | Shay | H04L 41/5009 702/182 |
| 2003/0233594 A1* | 12/2003 | Earl | G06F 11/0709 714/4.11 |
| 2004/0010716 A1* | 1/2004 | Childress | G06F 11/0748 709/223 |
| 2004/0088405 A1* | 5/2004 | Aggarwal | H04L 43/10 709/224 |
| 2004/0153712 A1* | 8/2004 | Owhadi | G06F 11/0709 714/4.2 |
| 2005/0033481 A1* | 2/2005 | Budhraja | H02J 13/00001 700/286 |
| 2005/0060567 A1* | 3/2005 | Shannon | G06F 11/0709 726/26 |
| 2005/0102567 A1* | 5/2005 | McGuire | G06F 11/2257 714/25 |
| 2005/0210331 A1* | 9/2005 | Connelly | G06F 11/0709 714/26 |
| 2006/0004832 A1* | 1/2006 | Langsford | G06Q 10/06 |
| 2006/0143717 A1* | 6/2006 | Ransome | G06F 21/88 726/35 |
| 2007/0150581 A1* | 6/2007 | Banerjee | H04L 41/22 709/224 |
| 2007/0180490 A1* | 8/2007 | Renzi | H04L 63/145 726/1 |
| 2008/0049779 A1* | 2/2008 | Hopmann | H04L 12/2807 370/431 |
| 2008/0091819 A1* | 4/2008 | Yang | H04L 43/50 709/224 |
| 2008/0109683 A1* | 5/2008 | Erwin | G06F 11/0709 714/46 |
| 2008/0215549 A1* | 9/2008 | Annau | G06F 16/338 |
| 2009/0013210 A1* | 1/2009 | McIntosh | H04L 41/0672 714/4.1 |
| 2010/0005103 A1* | 1/2010 | Hager | H04L 41/0213 707/E17.008 |
| 2010/0211826 A1* | 8/2010 | Villella | H04L 41/0213 707/E17.008 |
| 2010/0257583 A1* | 10/2010 | Ngo | H04L 41/069 709/223 |
| 2011/0055899 A1* | 3/2011 | Dollar | H04L 41/0213 709/224 |
| 2011/0264967 A1* | 10/2011 | Lovy | H04L 41/0631 714/49 |
| 2011/0277027 A1* | 11/2011 | Hayton | H04L 63/0815 726/8 |
| 2011/0289343 A1* | 11/2011 | Schaefer | H04L 63/0815 726/8 |
| 2012/0041858 A1* | 2/2012 | Lewis | H04L 41/16 705/34 |
| 2012/0201133 A1* | 8/2012 | Raleigh | G06Q 10/06375 370/230 |
| 2012/0209981 A1* | 8/2012 | Bolan | G05B 23/0267 709/223 |
| 2013/0097183 A1* | 4/2013 | McCracken | G06F 11/0709 707/748 |
| 2013/0246502 A1* | 9/2013 | Thorvaldsen | H04L 41/069 709/202 |
| 2014/0040343 A1* | 2/2014 | Nickolov | G06F 9/4856 709/201 |
| 2014/0359353 A1* | 12/2014 | Chen | G06F 11/1438 714/15 |
| 2015/0033243 A1* | 1/2015 | Carey | G06F 9/542 719/318 |
| 2015/0195165 A1* | 7/2015 | Boger | G06F 11/0787 709/224 |
| 2015/0195406 A1* | 7/2015 | Dwyer | H04M 3/42221 379/265.07 |
| 2015/0382208 A1* | 12/2015 | Elliott | G06F 16/245 370/252 |
| 2016/0041867 A1* | 2/2016 | Gokhale | G06F 11/0793 714/15 |
| 2017/0005861 A1* | 1/2017 | Strandzhev | H04L 41/0813 |
| 2017/0123957 A1* | 5/2017 | Gupta | G06F 11/366 |
| 2017/0373950 A1* | 12/2017 | Szilagyi | H04L 47/2416 |

FOREIGN PATENT DOCUMENTS

| | | | |
|---|---|---|---|
| WO | WO 02097651 A1 * | 12/2002 | H04L 41/0213 |
| WO | WO 2016007824 A1 * | 1/2016 | G06F 11/30 |

OTHER PUBLICATIONS

IBM Tivoli Log File Agent Version 6.2.3 User's Guide SC14-7484-01 © IBM Corporation 2011.*

IBM Tivoli Warehouse Summarization and Pruning Agent Version 6.2.3 User's Guide—SC23-9767-01 © IBM Corporation 2008, 2011.*

IIBM Tivoli Monitoring Version 6.3 Command Reference (Year: 2013).*

* cited by examiner

NETWORK STABILIZING TOOL

FIELD OF TECHNOLOGY

Aspects of the invention relate to stabilization of device networks.

BACKGROUND

Large server networks often require centralized process monitoring by a central console. Centralized process monitoring may support uniformity of performance of processes that run on remote client servers. The remote client servers may be distributed geographically or organizationally. When a process on a remote client server exhibits exceptional behavior, even if the central console identifies the behavior, remote remedial steps may be required. The remote remedial steps may be machine steps or human steps. The remote remedial steps may benefit from knowledge gained by the central console during monitoring activities.

It would therefore be desirable to provide apparatus and methods for providing, from a central console to a remote server, an instruction for remedying an exceptional behavior in the remote server.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
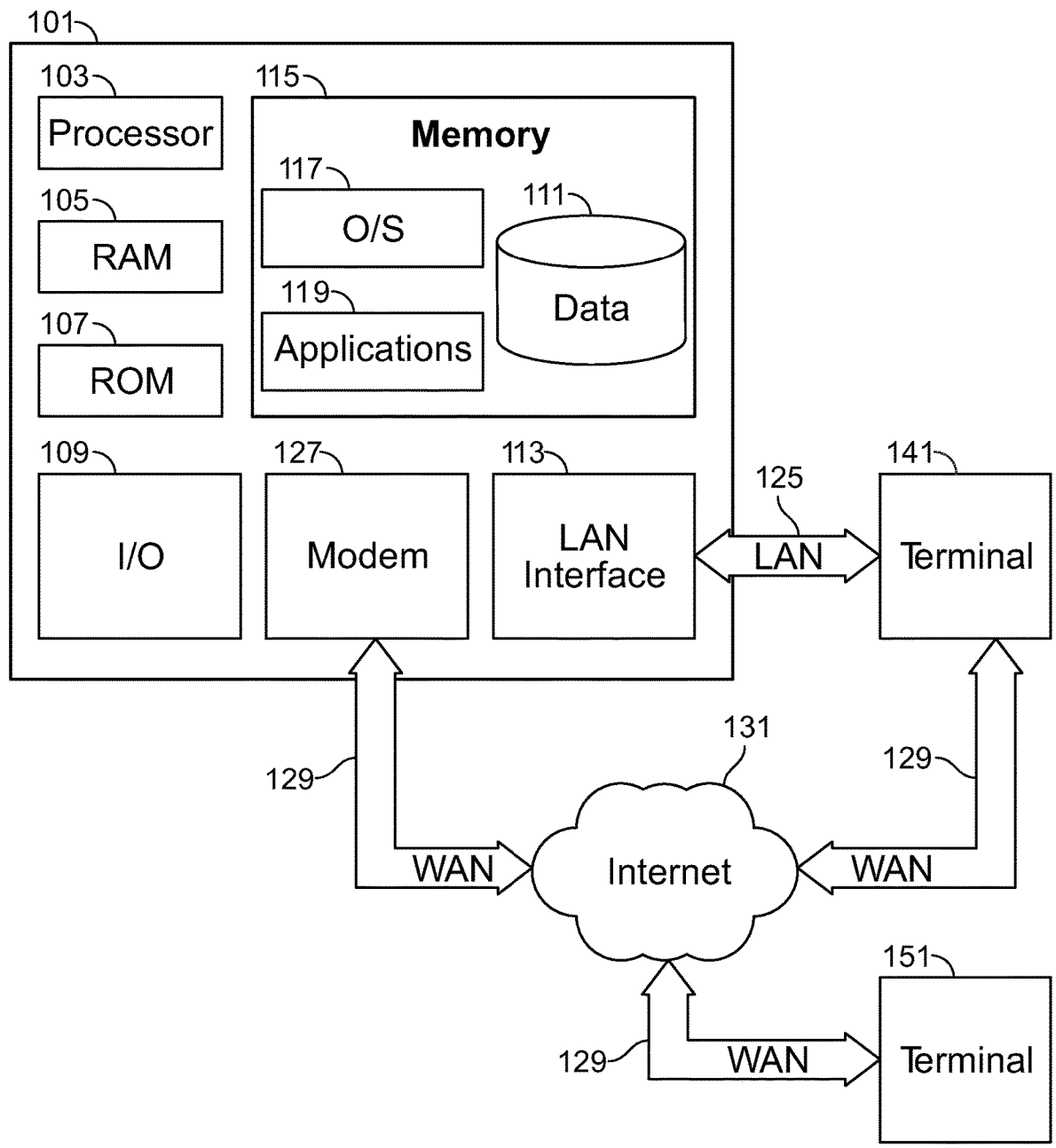
FIG. 1 shows illustrative apparatus in accordance with principles of the invention.

Apparatus and methods for protecting a server network from a failure are provided. The apparatus and methods may identify on client servers one or more offline agents. The agent or agents may include a monitoring agent such as that available from The IBM Corporation, Armonk, N.Y., under the trade name, TIVOLI. The agent may be deficient in functionality but still respond to console requests with responses.

Such agents may be known as "zombie agents." These agents may perform sporadically and jeopardize server health and stability. The apparatus may identify agents by type, server criticality, location and any other suitable characteristics. The apparatus may implement a series of iterative tests to identify agents that appear to be in an offline state. The apparatus may record combinations of failures in order to troubleshoot future incidents without need for an administrator to log in to the client servers individually.

The apparatus may include, and the methods may involve, a central console. The network may include the central console. The network may include one or more client servers. A client server may be referred to as a "remote server."

The apparatus and methods may be used in connection with various types of failure. Table 1 shows illustrative failures that may be prevented. One or more of the failures may occur concurrently. One or more of the failures may be causally related.

TABLE 1

| Illustrative failures that may be prevented. |
| --- |
| Illustrative failure |
| Remote server goes down |
| Console does not receive "SERVER DOWN" alert |
| Console does properly respond to "SERVER DOWN" alert |
| Remote server resource usage exceeds threshold. |
| Remote server administrator does not receive "USAGE EXCEEDS THRESHOLD" alert |
| Remote server administrator does not properly respond to "USAGE EXCEEDS THRESHOLD" alert |
| Console does not receive "USAGE EXCEEDS THRESHOLD" alert |
| Console does not properly respond to "USAGE EXCEEDS THRESHOLD" alert |
| Downstream process (depends on remote server) becomes unresponsive because of remote server's defective behavior and leads to outage or downtime applications or utilities hosted on remote server |

The central console may include a transmitter that is configured to periodically transmit to the client server a diagnostic probe. The probe may be referred to as a "heartbeat." "Periodically" may include transmission on a regular or periodic basis. "Periodically" may include transmission "from time to time." "Periodically" may include event-triggered transmission. The event may include a response to a transmission across the network of a packet of pre-determined size. The response may be observed. The response may be categorized as anomalous with respect to predetermined categories of response.

The event may include an iterative querying of the remote server or the agent with set of commands and sequential execution based on the response from remote agent which is defined as probe response. The probe may be selected to ascertain a state of an agent of the client server. The state may be "OFFLINE," "ONLINE," "HUNG (a state in which the agent appears to be responding and online but, in the background the core process is down or is not performing the intended functionality)" or any other suitable state. The diagnostic probe may include a query. The diagnostic probe may include a sequence of queries The diagnostic probe may include one or more of pinging to the remote server, "Telneting" to the remote port, remotely executing one or more commands or lines of code, observing responses to the commands and delivering one or more additional commands, based on the sequence of responses, to adaptively isolate a faulty agent function or behavior. Each query may be configured to cause, when the state is "ONLINE," a normal result in the agent.

An agent may be sufficiently functioning that a simple probe may indicate that the agent is functioning. If the agent is only functioning enough to provide a normal result in response to the simple probe, but is not functioning in other aspects, the simple probe may give a "false positive." The query or queries may be selected to probe aspects of the agent that are more diagnostic than those tested by the simple probe. This may avoid a false normal result.

The apparatus may include a processor. The processor may be configured to record a reaction of an agent to the query.

Table 2 shows illustrative examples of probes and associated queries normal results and agent reactions.

TABLE 2

Illustrative examples of probes and associated queries, normal results and anomalous reactions, with illustrative further diagnostic steps in parentheses.

| Probe ("$P_x$") | Query ("$Q_y$") | Outcome (Normal result or anomalous reaction; ("$R_z$")) | ANOMALOUS (Flag: YES/NO) |
|---|---|---|---|
| X = 1 Remotely query agent status | Y = 1 Ping status | Z = 1 Responds to ping within predetermined acceptable time limits Proceed to Probe 2 (X = 2) | NO |
| | | Z = 2 Does NOT Respond to ping within predetermined acceptable time limits | YES (Invoke the "Remote agent restart script) |
| | | Z = 3 No response | YES (Invoke "Remote agent restart script) |
| | Y = 2 Invoke Remote Agent restart script | Z = 1 Remote Agent restarted successfully and responding to ping | NO |
| | | Z = 2 Remote agent restarted but still not responding to the ping | YES 2(a) (invoke the server restart script (Non-prod)) 2(b) (if remote agent still doesn't respond to ping, invoke agent restart at console) |
| X = 2 Remote query of agent health and functionality | Y = 1 Invoke Remote Agent Functionality validator | Z = 1 Iterative check results indicates the health behavior of the agent | NO |
| | | Z = 2 Failure manifests during iterative querying | YES (Invoke relevant query scripts based on failure codes that are output-some or all codes indicating stage of failure) |
| X = 3 Read Error code identifier and corresponding comment picker (e.g., error code 203) | | Z = 1 Error code 203 indicates access denied (exception error)captured at previous stage | YES (The respective script will be triggered) |
| | | Z = 2 The error code identifier not being able to pick the comments from that of the available known errors | YES (The access denied issue will pull out the relevant comments and display for engineers to troubleshoot) |
| | | Z = 3 Error code lacks relevant comments | YES (Flag exception and note for tool admin) |

The processor may be configured to activate on the central console a restart process, such as a script to restart the failed agent or other executable code. The restart process may be configured to restart the agent.

The processor may be configured to activate on the remote server a restart process such, as a script to restart the failed agent or other executable code. The restart process may be configured to restart the agent.

The processor may be configured to record the state.

The processor may be configured to map the reaction to a system administrator instruction.

Table 3 shows illustrative reactions (shown in Table 2) and mapped administrator instructions.

TABLE 3

Illustrative reactions (shown in Table 2) and mapped administrator instructions.

| Probe (X) | Reaction (Z) | Instruction |
| --- | --- | --- |
| 1 | 1 | Administrator to coordinate H/W checks |
| 1 | 1 | Investigate resource exhaustion |
| 1 | 2(a) | Investigate the health of Remote Agent at Server End |
| 1 | 2(b) | Investigate the health of Agent at Console End |
| 2 | 1 | Iterative querying on the health of the remote agent |
| 2 | 2 | Picking up the right/relevant comments based on error code |
| 3 | 1 | Identifying and Defining the resultant comment statement |

One or more of the probes, reactions and instructions may be diagnostically dependent on each other. Combinations of two or more of the probes and reactions may be diagnostically significant.

A system administrator of the client server may possess ownership of the client server. The ownership may include rights or permission to repair the agent. The ownership may include rights or permission to replace the agent.

The transmitter may be further configured to transmit the system administrator instruction to the client server.

The processor may be a processor that does not possess ownership of the remote server. The processor may be a processor that does not possess permission to repair the agent. Permission may include one or more of remote non-intrusive permission, remote intrusive permission, remote interactive login permission, remote non-interactive login permission and any other suitable type of permission.

The processor may be configured to record the state and a time in a log entry at the console. The time may correspond to a time of initiation of the probe. The log entry may correspond to the agent and the client server.

The processor may be configured to remove from the log a duplicate entry that corresponds to the agent and the client server. A duplicate entry may correspond to an agent that is running or purportedly running a process, or is mapped to run a process, that is being run by, or is mapped to be run by, another agent.

The processor may be configured to record a number of times that the state is "OFFLINE." The number of times may be a number of times for a period, for example, a minute, an hour, a day, a week, a month, a year, a duty cycle or any other suitable time period.

The methods may include a method for protecting a server network from the failure. The method may include transmitting periodically from the console server to the client server a diagnostic probe selected to ascertain a state of the agent. The method may include a reaction by the agent in response to query. The method may include activating on the console server a restart process that is configured to restart the agent. The method may include triggering from the console server a restart process on the client server that is configured to restart the agent. The method may include and recording the state. The method may include mapping the reaction to the system administrator instruction. The method may include transmitting the system administrator instruction to the client server.

The transmitting may include an electronic processes. The electronic processes may be an electronic process that does not possess ownership of the agent. The electronic processes may be an electronic process that does not possess ownership of the remote server. The electronic processes may be an electronic process that does not possess permission to repair the agent. The electronic processes may be an electronic process that does not possess permission to repair the client server.

The method may be performed by electronic processes, none possessing ownership of the agent. The method may be performed by electronic processes, none possessing ownership of the remote server.

The method may be performed by electronic processes, none possessing permission to repair the agent.

The method may include recording the state and the time in a log entry at the console.

The method may include removing from the log the duplicate entry.

The method may include recording the number of times per month that the state is "OFFLINE" for the agent and the client server.

The method may include proving to a user a dashboard display. The display may include a plurality of log entries. The agent may be included in one or more of the log entries. The agent may be one of a plurality of distinct agents. The client server may be one of a plurality of client servers. The agents may run on the servers. Each log entry may identify one of the agents.

The method may include providing a display filter that culls the log entries. The filter may cull based on one or more of device owner, Customer Technology Operations ("CTO") agent identity, business division, server environment and any other suitable parameter.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to create execute probes, execute queries, record responses, look up system administrator instructions, initiate restart processes and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
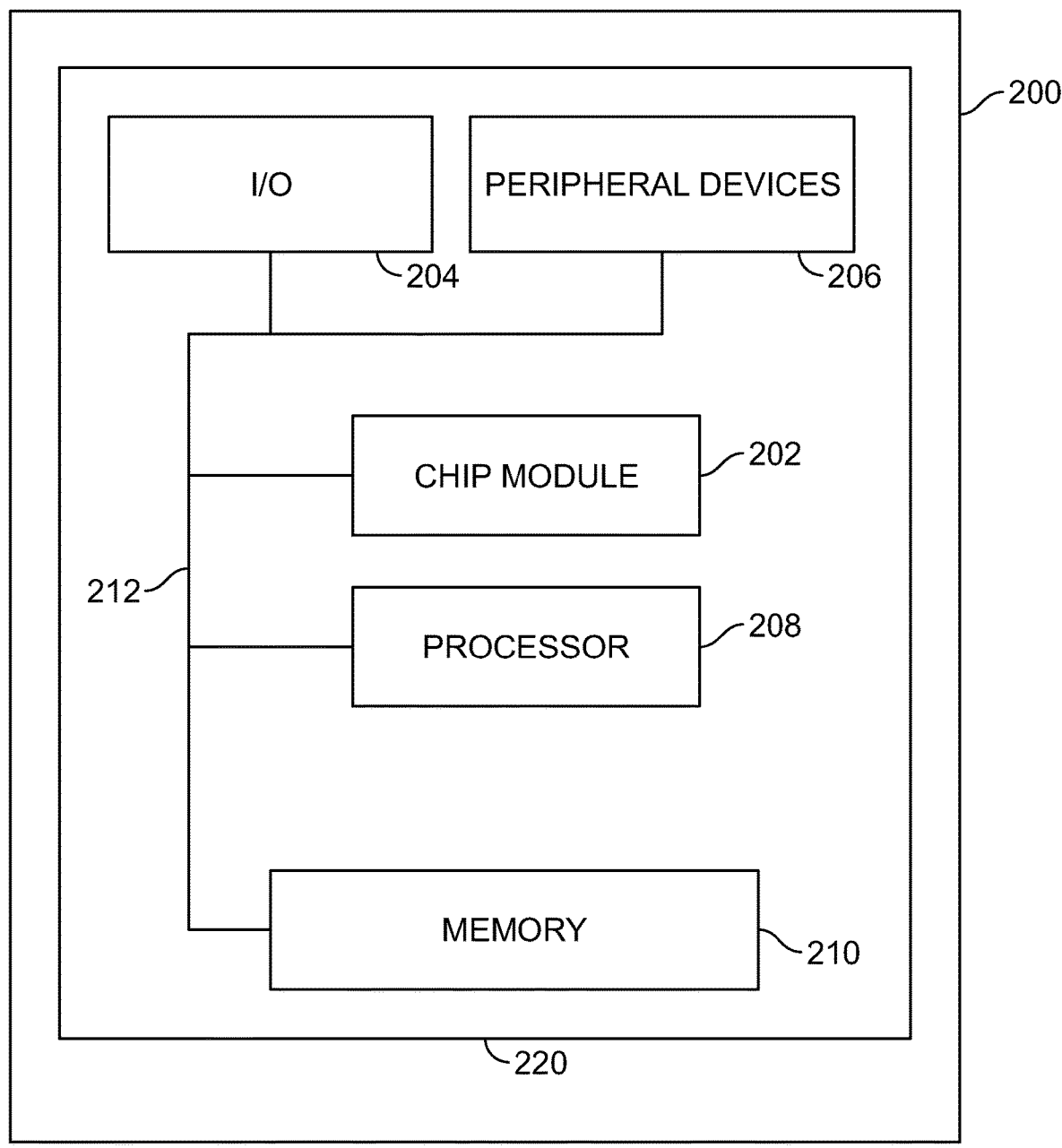
FIG. 2 shows illustrative apparatus in accordance with principles of the invention.

FIG. 2 shows an illustrative apparatus 200 that may be configured in accordance with the principles of the invention. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: exception reports, rules tables, lexical items tables, computer code and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
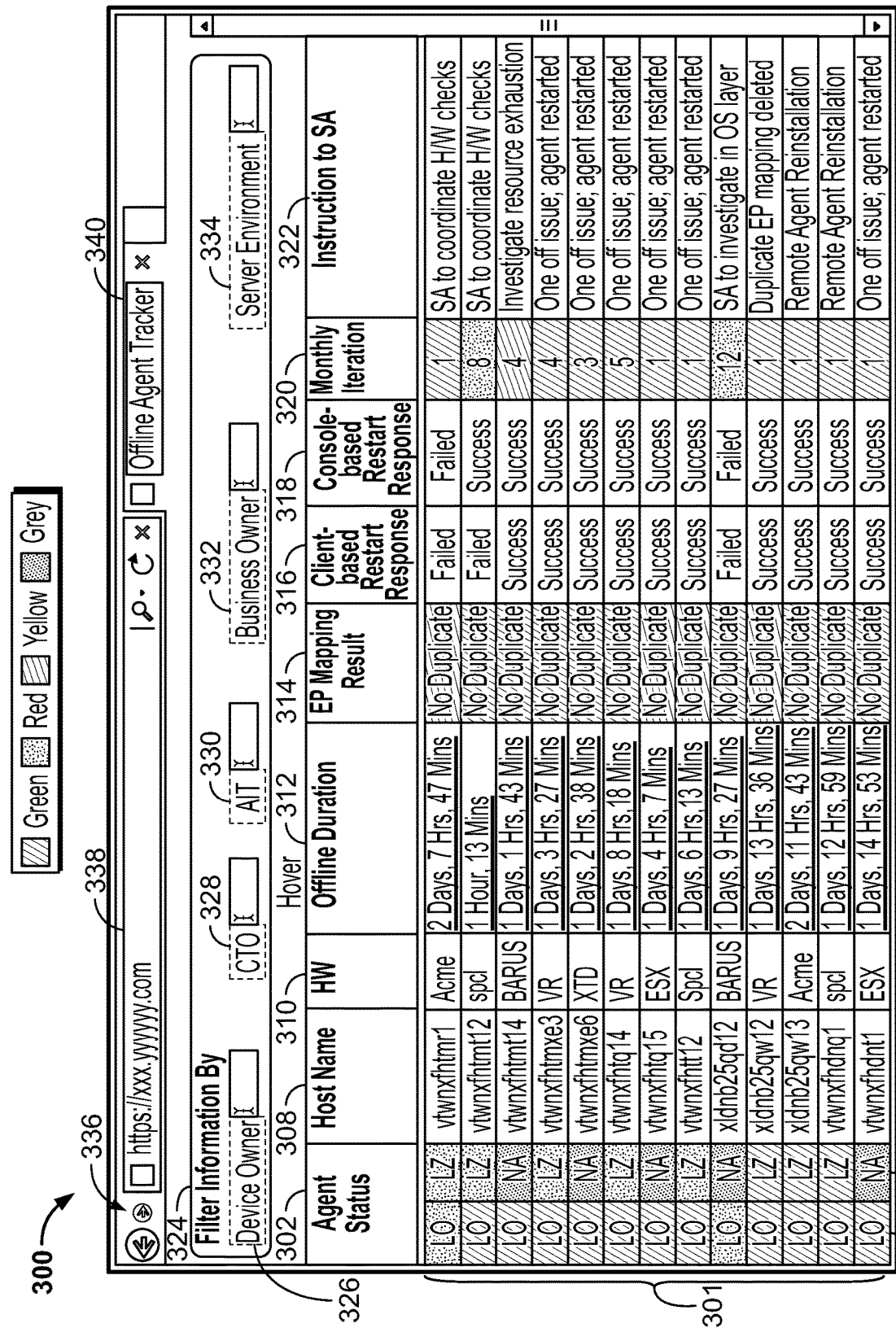
FIG. 3 shows information in accordance with principles of the invention.

FIG. 3 shows a view of illustrative information 300. Information 300 may be used or generated in connection with protecting a server network from a failure. Information 300 may be stored in machine readable memory in one or more of the apparatus shown in FIGS. 1 and 2. Information 300 may be stored in any suitable non-transitory medium. Information 300 may be used or displayed by one or more of the apparatus shown in FIGS. 1 and 2. Information 300 may be used or displayed in connection with the central console. Information 300 may include rows 301. Each of rows 301 may be a log entry. Each log entry may correspond to an agent.

Information 300 may include agent status 302. Agent status 302 may indicate a status of the agent. The status may correspond to a state of the agent. Agent status 302 may include agent status flag 304. Agent status 302 may include agent status flag 306. Table 4 lists meanings of illustrative agent status flag values.

TABLE 4

Meanings of illustrative agent status flag values.

| Illustrative Agent Status Flag Value | Meaning |
|---|---|
| LO | LOG MONITORING AGENT |
| LZ | HARDWARE MONITORING AGENT |

Agent status flags 304 and 306 may be color-coded. Table 5 lists meanings of illustrative agent status flag color-codes.

TABLE 5

Meanings of illustrative agent status color codes.

| Illustrative Agent Status Flag Color | Meaning |
|---|---|
| Red | Agent Failed(ing) repeatedly |
| Green | Agent recovered/Up and Running |
| Brown | Agent recovered with errors |

Information 300 may include host name 308. Host name 308 may identify a remote server on which the agent is running. Information 300 may include hardware ("HW") 310. HW 310 may include an identification of a remote server type. The remote server type may include a manufacturer. The remote server type may include a model.

Information 300 may include offline duration 312. Offline duration 312 may include a duration for which the agent has been offline. The duration may include a start time. The duration may include an end time. The duration may include an elapsed time. The duration may include an amount of time.

The offline duration may be determined by the transmission by the console server of a probe to the remote server and the observation of an agent reaction, such as is illustrated in Table 2. If the agent reaction is anomalous, the console may determine that the agent is offline. Offline duration 312 may be computed by calculating the total time represented by an unbroken sequence of anomalous reactions.

Information 300 may include EP mapping result 314. EP mapping result 314. Enterprise portal ("EP") mapping result 314 may indicate whether an agent is logged more than one time in information 300. The EP mapping result may be obtained from any suitable enterprise portal. For example, the EP mapping result may be obtained from an enterprise portal available from The IBM Corporation, Armonk, N.Y., under the trade name TIVOLI ENTERPRISE PORTAL.

EP mapping result 314 may be color-coded. Table 6 lists meanings of illustrative EP mapping result colors.

TABLE 6

Meanings of illustrative EP mapping result colors.

| Illustrative EP Mapping Result Color | Meaning |
|---|---|
| Yellow | WARNING: Number of times failing exceeds a threshold |
| Green | Previously failed, but now recovered |

If an agent is logged more than one time in information 300, any suitable method may be used to determine the current record entry of the agent and eliminate duplicates or obsolete record entries. A duplicate record entry may be created during the transfer of network state information from the central console to a backup central console or vice-versa.

Information 300 may include client-based restart response 316. Restart response 316 may indicate whether the agent successfully ("SUCCESS") restarted in response to a restart process performed by the client server or did not ("FAILED") restart in response to the process.

Information 300 may include console-based restart response 318. Console-based restart response 318 may indicate whether the agent successfully ("SUCCESS") restarted in response to a restart process performed by the console server or did not ("FAILED") restart in response to the process.

Information 300 may include monthly iteration 320. Monthly iteration 320 may indicate how many restarts were performed on the agent in the past month. Any other suitable time period may be used.

Monthly iteration 320 may be color-coded. Table 7 lists meanings of illustrative monthly iteration colors.

TABLE 7

Meanings of illustrative monthly iteration colors.

| Illustrative EP Mapping Result Color | Meaning |
|---|---|
| Green | Failed and recovered; not repeated offender |
| Yellow | WARNING/POSSIBLE WARNING: Failed more than n (e.g., 2, 3, 4, 5, 10, 15 . . .) times |
| Red | Repeat offender; check manually |

Information 300 may include instructions to system administrator ("SA") 322. The instructions may be selected based on one or more of agent reactions, such as those illustrated in Table 3, offline duration 312, client-based restart response 316, console-based restart response 322, monthly iteration 320 or any other suitable information.

The view may include information filter controls 324. A user may use information filter controls 324 to filter information 300 by device (host) owner 326. Owner 326 may be an owner of the server identified in host name 308. The owner may be an enterprise line of business.

A user may use information filter controls 324 to filter information 300 by CTO 328. CTO 328 may be a line of business A user may use information filter controls 324 to filter information 300 by application identification tracker ("AIT") 330. Application identification tracker 330 may be an identity of an agent, such as by one or more of application provider, application vendor, application name, version number, release number or any other suitable identifying information.

A user may use information filter controls 324 to filter information 300 by business owner 332. Business owner 332 may be an entity that controls the device owner.

A user may use information filter controls 324 to filter information 300 by server environment 334. Server environment 334 may correspond to a category of use, whether for production, training, testing or any other suitable category Table 8 lists examples of different values that may be entered into filter controls 324.

TABLE 8

Examples of different values that may be entered into filter controls 324.

| Device Owner 326 | CTO 328 | AIT 330 | Business Owner 332 | Server Environment 334 |
|---|---|---|---|---|
| Name of the SA Manager | BUSINESS NAME | AIT 435 | NAME OF APP OWNER | User acceptance testing |
| Name of the SA Manager | BUSINESS NAME | AIT 436 | NAME OF APP OWNER | Development |
| Name of the SA Manager | BUSINESS NAME | AIT 437 | NAME OF APP OWNER | Production |

The view may include server network portal controls 336. Server network portal controls 336 may include URL selector 338. A user may use URL selector 338 to select a server domain from which to populate the log. Server network portal controls 336 may include tool selector 340. Tool selector 340 may be used to select a network administration tool, such as the apparatus.

Processes in accordance with the principles of the invention may include one or more features of the processes illustrated in FIGS. 1-3. For the sake of illustration, the steps of the illustrated processes will be described as being performed by a "system." The "system" may include one or more of the features of the apparatus that are shown in FIGS. 1-2 and/or any other suitable device or approach. The "system" may be provided by an entity. The entity may be an individual, an organization or any other suitable entity.

Figure 4:
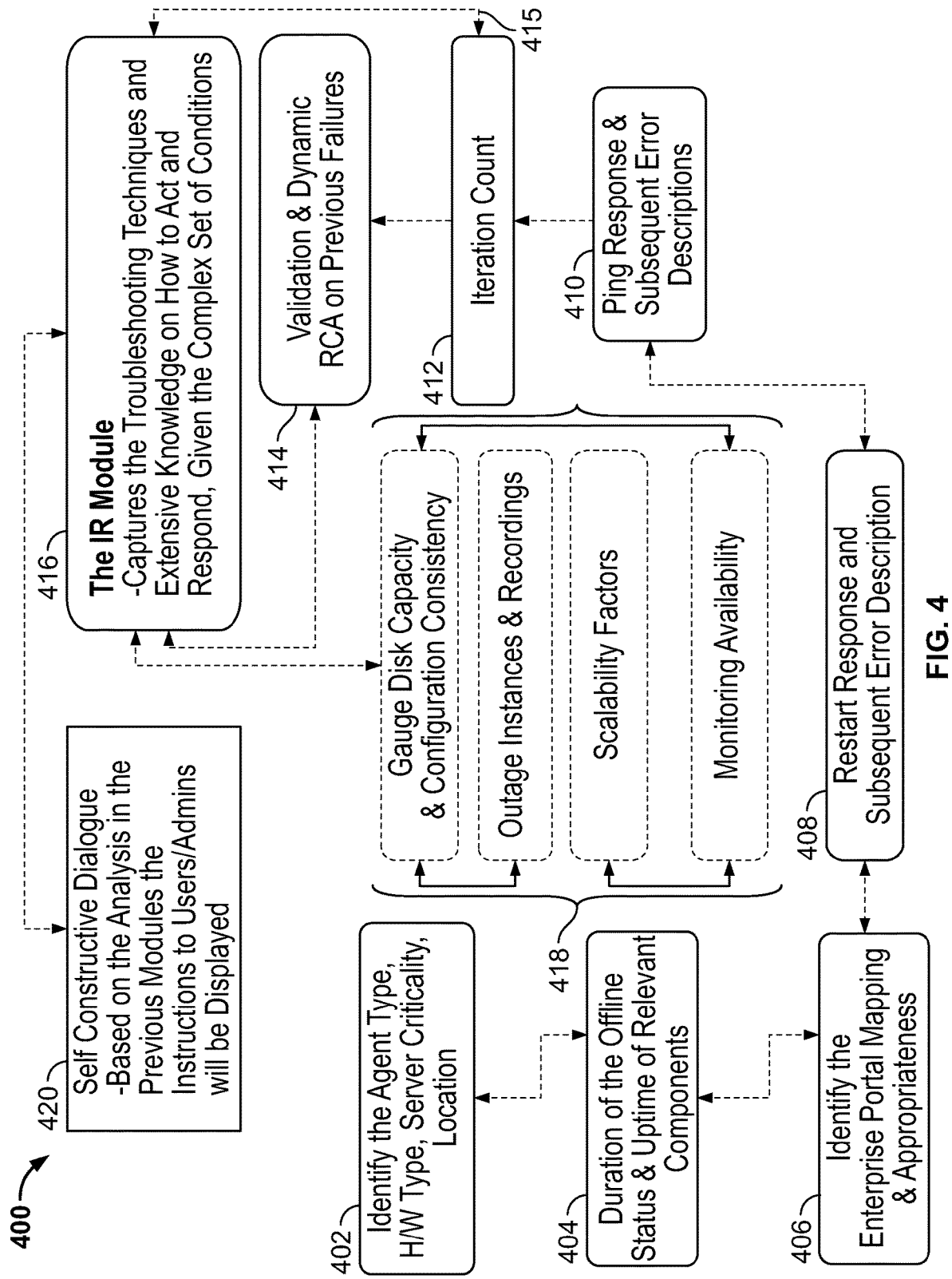
FIG. 4 shows a process in accordance with principles of the invention.

FIG. 4 shows illustrative steps of illustrative process 400 for protecting a server network from a failure. The system may perform one or more of the steps of process 400 to generate some or all of information 300 (shown in FIG. 3). The system may use some or all of information 300 to perform one or more of the steps of process 400.

Process 400 may begin at step 402. At step 402, the system may identify for the agent one or more of: the agent type (such as a type selectable in AIT 330 (shown in FIG. 3)), the hardware ("H/W") type (such as a type shown in HW 310 (shown in FIG. 2)), a server criticality (which may be a category such as HIGH, MEDIUM, LOW) and a server location (which may be or correspond to a geographic location or a network location).

At step 404, the system may quantify duration of offline status for the agent or one or more types of agents (e.g., log monitoring agents ("LO"), hardware monitoring agents ("LZ")). The duration may be duration 312 (shown in FIG. 3).

At step 406, the system may identify duplicate agent entries via an enterprise portal mapping, such as that discussed in connection with EP Mapping 314.

At step 408, the system may initiate a client-based restart of the agent that is intended to run on the client. The system may observe a client server response, such as that shown in connection with client-based restart response 316 (shown in FIG. 3). The system may save a client error description in response to the client-based restart.

At step 410, the system may ping the client server. Pinging the client server may be a console-based restart procedure for restarting the agent on the client server. The system may observer a client server response to the ping. The response to the ping may correspond to console-based restart response 318 (shown in FIG. 3). The system may save a client error description in response to the ping.

At step 412, the system may update a counter that provides information for monthly iteration 320 (shown in FIG. 3).

At step 414, the system may perform validation on previous agent failures. This may include ascertaining whether agent is configured in conformance with a defined standards. A failure may correspond to a period during which the agent is offline. The system may perform root cause analysis ("RCA") on one or more of the previous failures. The RCA may include "dynamic" RCA, meaning that an RCA process is run along with the query, or other process described herein, contemporaneously, "on the fly," concurrently, in parallel or on a switched-task basis.

At step 416, the system may utilize an iterative response ("IR") module. The IR module may capture troubleshooting techniques and knowledge of how to act and respond given a complex set of conditions. For example, the IR module may build an index of probes and associated queries, normal results, anomalous reactions such as those shown in Table 2. One or more of illustrative steps 418 may be undertaken as part of step 416. Two or more of illustrative steps 418 may be interdependent in that one may provide input into another. The steps may be undertaken successively to focus in on a problematic aspect of an agent's behavior, to ascertain and narrow down an issue.

The IR module in step 416 may construct instructions for system administrators of the client server on which the agent is supposed to be running. The IR module in step 416 may construct instructions for users of the client server on which the agent is supposed to be running. The instructions may be based on a mapping of one or more of normal results and anomalous reactions to instructions, such as that illustrated in Table 3.

The interactive querying of the each of the probe sequentially feeds inputs to successive probes till it either fixes the identified issue by itself or find comments that would enable engineers to fix it manually.

Thus, methods and apparatus for preventing failure have been provided. Persons skilled in the art will appreciate that the present invention can be practiced by other than the described embodiments, which are presented for purposes of illustration rather than of limitation. The present invention is limited only by the claims that follow.

What is claimed is:

1. A central console for protecting a server network from failure, the network including the central console, a client server, and an agent of the client server, wherein the agent is a log monitoring agent or a hardware monitoring agent, the central console comprising:
   a processor that is configured to identify, for the agent, an agent type, a hardware type of the remote server, a server network criticality, and a geographic location of the server network;
   a transmitter that is configured to periodically transmit to the client server a diagnostic probe selected to ascertain a state of the agent of the client server, the diagnostic probe including a query, the query including a ping to the client server, wherein:
      the diagnostic probe is an event-triggered transmission that is triggered, by the central console, in response identifying an anomalous response of the client server to a transmission across the network of a packet having a predetermined size; and
   the processor that is configured to execute a hierarchical set of executable commands, the set of executable commands comprising:
      a first executable command, said first executable command operable to record an agent reaction to the ping;
      a second executable command, said second executable command being activated in the event that the agent does not respond to the ping within a predetermined time limit, said second executable command operable to activate on the client server a client-based restart process, configured to run on the client, that is configured to restart the agent without human intervention;
      a third executable command, said third executable command being activated in the event that the agent restarts but still does not respond to the ping, said third executable command operable to trigger a console-based restart process performed by the console that is configured to restart the agent, the console-based restart process for restarting the agent comprising pinging the client server and identifying a console-based restart response, the console-based restart response being a response of the client server to the ping;
      a fourth executable command, said fourth executable command being operable to update a counter that stores a value of a number of restarts performed on the agent during a month;
      a fifth executable command, said fifth executable command being activated in the event the agent response to the ping is anomalous, the fifth executable command further operable to calculate offline duration of the agent based on the total time represented by an unbroken sequence of a plurality of anomalous responses;
      a sixth executable command, said sixth executable command based on the offline duration of the agent, said sixth executable command being operable to activate on the client server a client-based restart process, said client-based restart process configured to run on the client and that is configured to restart the agent without human intervention;
      a seventh executable command, said seventh executable command being operable to ascertain whether the agent is configured in conformance with a defined status, the status being selected from a group comprising agent failed(ing) repeatedly, agent recovered/up and running, and agent recovered with errors; and
      an eighth executable command, said eighth executable command operating in parallel with the other executable commands, said eighth executable command being operable to perform a dynamic root cause analysis on one or more previous failures of the agent, wherein the failures are periods during which the agent is determined to be offline; and
   an iterative response module that is configured to:
      build instructions for remediating failure of the agent, the instructions including an index of probes and associated queries, normal results and anomalous reactions, the index of probes built by the iterative response module including remotely querying agent status, remotely querying agent health and functionality, and reading error code identifiers, the building being based on the agent reaction to the pings, an offline duration of the agent, the client-based restart response of the agent and the console-based restart response of the agent, wherein execution of a probe included in the index of probes sequentially feeds into a successive probe included in the index of probes to remediate a failure; and
      transmit the instructions to a system administrator of the client.

2. The system of claim 1 wherein the processor is further configured to record the state and a time in a log entry at the console, the time corresponding to initiation of the probe and the log entry corresponding to the agent and the client server.

3. The system of claim 1 wherein the processor is further configured to remove from the log a duplicate entry corresponding to the agent and the client server.

4. The system of claim 1 wherein the processor is further configured to record a number of times per month that the state is "OFFLINE" for the agent and the client server.

5. A method for protecting a server network from catastrophic failure, the network including a central console server, a client server, and an agent of the client server, wherein the agent is a log monitoring agent or a hardware monitoring agent, the method comprising:
   identifying, for the agent, an agent type, a hardware type of the remote server, a server network criticality, and a geographic location of the server network;
   transmitting periodically from the console server to the client server a diagnostic probe selected to ascertain a state of the agent of the client server, the diagnostic probe including query, the query including a ping to the client server, wherein the diagnostic probe is transmitted in response to identifying an anomalous response to the client server to a transmission across the network of a packet having a predetermined size;
   recording an agent reaction to the ping;
   in the event that the agent does not respond to the ping within a predetermined time limit, activating on the client server a client-based restart process, configured to run on the client, that is configured to restart the agent without human intervention and recording the state;
   in the event that the agent restarts but still does not respond to the ping, triggering from the console server a console-based restart process performed by the console server that is configured to restart the agent without human intervention, the console-based restart process for restarting the agent comprising pinging the client server and identifying a console-based restart response, the console-based restart response being a response of the client server to the ping;

in the event that the agent responds to the ping with an anomalous response, said anomalous response being determined as if the agent is offline, calculating the offline duration of the agent based on the total time represented by an unbroken sequence of a plurality of anomalous responses and recording the state;

updating a counter that stores a value of the total number of anomalous responses in the unbroken sequence of the plurality of anomalous responses;

activating on the client server a client-based restart process, based on the unbroken sequence of the plurality of anomalous responses, said client-based restart process configured to run on the client and that is configured to restart the agent without human intervention;

updating a counter that stores a value of a number of restarts performed on the agent during a month;

ascertaining whether the agent is configured in conformance with a defined status, the status being selected from a group comprising agent failed(ing) repeatedly, agent recovered/up and running, and agent recovered with errors;

in parallel to the ascertaining, performing a dynamic root cause analysis on one or more previous failures of the agent, wherein the failures are periods during which the agent is determined to be offline;

building, using an iterative response module, instructions for remediating failure of the agent, the instructions including an index of probes and associated queries, normal results and anomalous reactions, the index of probes built by the iterative response module including remotely querying agent status, remotely querying agent health and functionality, and reading error code identifiers, the building being based on the agent reaction to the pings, an offline duration of the agent, the client-based restart response of the agent and the console-based restart response of the agent, wherein execution of a probe included in the index of probes sequentially feeds into a successive probe included in the index of probes to remediate a failure; and transmitting the instructions to a system administrator of the client server.

6. The method of claim 5 wherein the transmitting is performed by an electronic process that does not possess ownership of the agent.

7. The method of claim 5 wherein the transmitting is performed by an electronic process that does not possess ownership of the client server.

8. The method of claim 5 wherein the transmitting is performed by an electronic process that does not possess permission to repair the agent.

9. The method of claim 5 wherein the transmitting is performed by an electronic process that does not possess permission to repair the client server.

10. The method of claim 5 wherein none of the method steps are performed by an electronic process that possesses ownership of the agent.

11. The method of claim 5 wherein none of the method steps are performed by an electronic process that possesses ownership of the client server.

12. The method of claim 5 wherein none of the method steps are performed by an electronic process that possesses permission to repair the agent.

13. The method of claim 5 wherein none of the method steps are performed by an electronic process that possesses permission to repair the client server.

14. The method of claim 5 further comprising recording the state and a time in a log entry at the console, the time corresponding to initiation of the probe and the log entry corresponding to the agent and the client server.

15. The method of claim 5 further comprising removing from the log a duplicate entry corresponding to the agent and the client server.

16. The method of claim 5 further comprising recording counter that stores a number of times per month that the state is "OFFLINE" for the agent and the client server.

17. The method of claim 5 further comprising providing a dashboard that shows a plurality of log entries;
wherein:
the log entry is one of a plurality of log entries;
the agent is one of a plurality of distinct agents;
the client server is one of a plurality of client servers;
the agents run on the client servers; and
each log entry identifies one of the agents.

18. The method of claim 17 further including providing a display filter that culls the log entries by device owner, business division and server environment.

* * * * *